L. J. FAZENDIN.
SOLDERING IRON HEATER.
APPLICATION FILED DEC. 20, 1920.
1,411,333.
Patented Apr. 4, 1922.
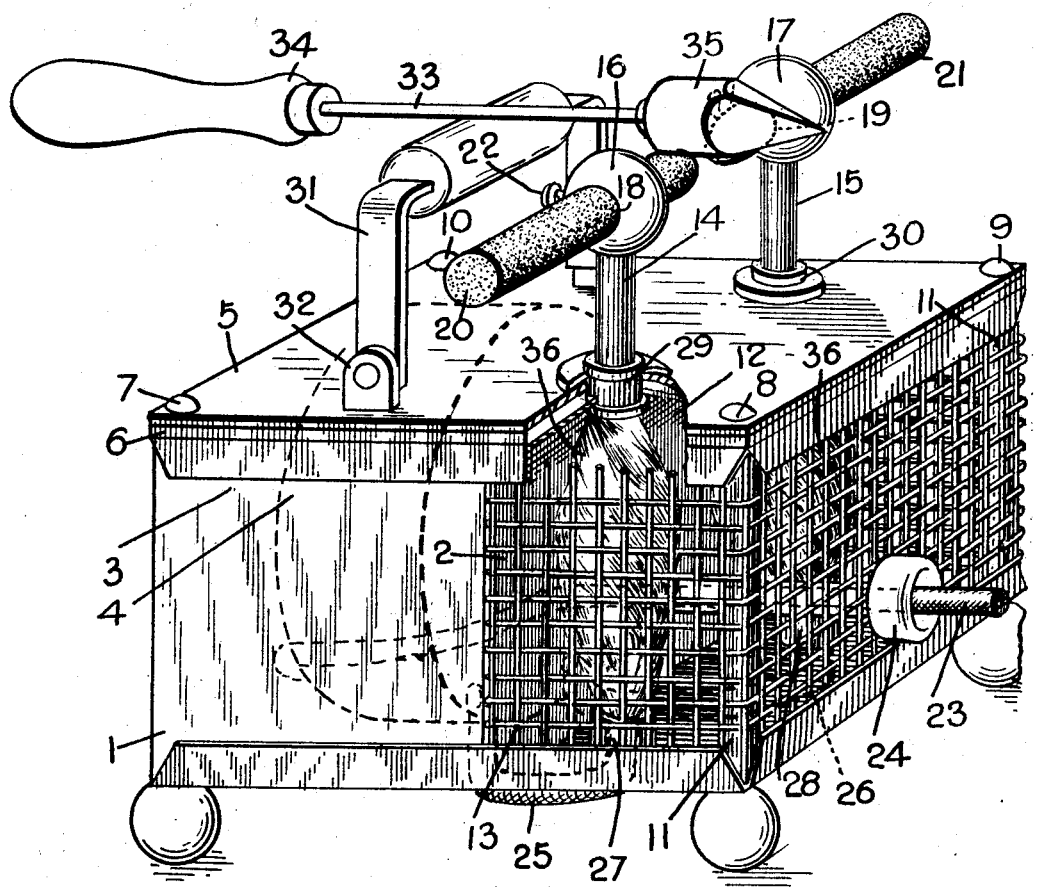
INVENTOR
LEONARD J. FAZENDIN
BY

UNITED STATES PATENT OFFICE.

LEONARD JOSEPH FAZENDIN, OF ORILLIA, ONTARIO, CANADA.

SOLDERING-IRON HEATER.

1,411,333. Specification of Letters Patent. Patented Apr. 4, 1922.

Application filed December 20, 1920. Serial No. 432,065.

*To all whom it may concern:*

Be it known that I, LEONARD JOSEPH FAZENDIN, of the town of Orillia, in the county of Simcoe, in the Province of Ontario, Canada, have invented certain new and useful Improvements in Soldering-Iron Heaters, of which the following is a specification.

My invention relates to improvements in soldering iron heaters and the object of the invention is to devise means which is portable and which is exterior to and independent of the soldering iron for heating the soldering iron by electrical means so that the soldering iron can be carried in the hand to the work independently of the heater, and also to devise such a device which is readily attachable for current supply to an ordinary incandescent socket and in which the wiring will not become overheated and it consists essentially of the following arrangement and construction of parts as hereinafter more particularly explained.

The drawing represents a perspective detail of my soldering iron heater showing the soldering iron in position.

1 indicates a main casing which is divided into two compartments by the partition 2. The compartment 3 contains a transformer 4 for converting the alternating current of the incandescent circuit into a direct current. 5 is the top of the main casing which is insulated from the casing by a suitable insulating material 6. The top 5 is secured in position by bolts 7, 8, 9 and 10, the bolts 8 and 9 passing through spacing sleeves 11 whereby that the portion of the bottom of the main casing forming the bottom of the compartment 12 is spaced apart from the portion of the top 5 forming the top of the casing compartment 12. 13 is an open grill work which forms the outer walls of the compartment 12. 14 and 15 are standards which are carried by the top 5 and suitably insulated from the main casing. The upper ends of the standards 14 and 15 are provided with knobs 16 and 17 provided with diametric orifices 18 and 19 through which extend carbon sticks 20 and 21 forming arcing terminals as will hereinafter be described.

The carbon sticks are secured in position by set screws 22. 23 is a cable containing the leading-in wires which passes through an insulating sleeve 24 into a compartment 3. The cable to 23 contains two wires passing to the leading-in terminals of the transformer 4. 25 and 26 are wires leading out from the transformer and passing through the bottom of the compartment through suitably insulated sleeves 27 and 28 and through the insulated sleeves 29 and 30 forming the support for the standards 14 and 15 to which the wires are electrically connected.

It will thus be seen that a complete circuit is formed broken only between the points of the carbon sticks 20 and 21.

31 is a handle which is pivotally secured to lugs 32 extending upward from the casing top 5.

When the device is used for heating a soldering iron the handle 31 is placed in a vertical position and forms a support for the shank 33 of the soldering iron 34, the head 35 of the iron resting upon the carbon points of the sticks 20 and 21 thereby completing the arcing circuit. This circuit passing through the head of the iron raises it to the required temperature for use. The iron can then be lifted off and carried to any point required.

In order to prevent the device being overheated by electric current passing to the carbon sticks, I unravel the strands of the wires 25 and 26 as indicated at 36 thereby providing for a free passage of air through the interstices formed between the strands of the wire and thereby keeping the wire cool.

Electrically heated soldering irons as far as the applicant knows have been constructed with the electric heating unit forming an integral part of the iron and has therefore to be carried with the iron to the work making the iron awkward and cumbersome to handle.

By my device the heating appliance is absolutely independent of the iron and the iron is therefore easily handled without the extra weight which otherwise has to be carried with it.

What I claim as my invention is.

1. A soldering iron heater, comprising a main casing, provided with a compartment having an openwork wall, terminal wires leading up through the compartment of the casing and having an unravelled portion contained within such compartment, and opposing arcing terminals carried by the casing to which such terminal wires lead and between which the soldering iron head is adapted to rest to complete a circuit therethrough.

2. A soldering iron heater, comprising a main casing divided into two compartments, one compartment being provided with an openwork wall and a transformer being located in the other compartment, terminal wires leading from the transformer and extending upward through the compartment having the openwork wall and having an intermediate portion unravelled, standards carried by the compartment top, and arcing points carried by the standards and between which the head of the soldering iron is adapted to rest to close the circuit.

3. A soldering iron heater comprising a main casing containing a transformer, arcing points carried by the casing top, circuit wires leading to the transformer and from the transformer to the arcing points, and a cooling means for limiting the rise of temperature in that portion of the wire extending between the transformer and the arcing points.

LEONARD JOSEPH FAZENDIN.